S. B. SHELDON.
GAS PRODUCER.
APPLICATION FILED MAR. 26, 1910.

1,003,524.

Patented Sept. 19, 1911.

7 SHEETS—SHEET 1.

Witnesses:
J. H. Alfred
H. R. Wilkins

Inventor
Samuel B. Sheldon
by Poole & Brown
Attys

S. B. SHELDON.
GAS PRODUCER.
APPLICATION FILED MAR. 26, 1910.
1,003,524.
Patented Sept. 19, 1911.
7 SHEETS—SHEET 5.
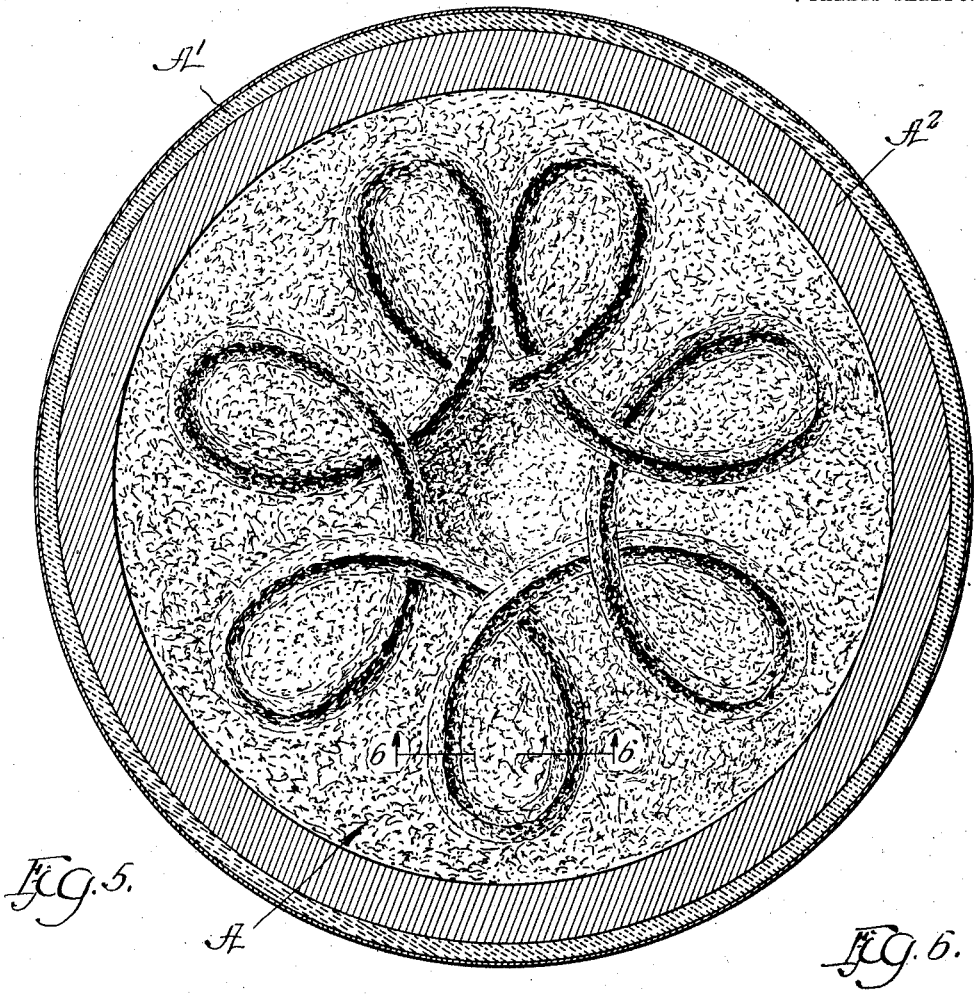
Fig. 5.
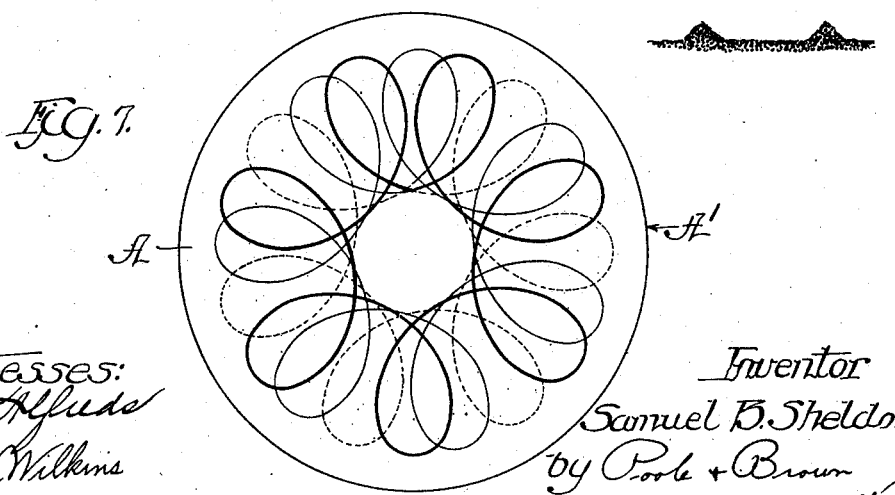
Fig. 6.
Fig. 7.
Witnesses:
Inventor
Samuel B. Sheldon
by Poole + Brown
Attys S. B. SHELDON.
GAS PRODUCER.
APPLICATION FILED MAR. 26, 1910.
1,003,524.  Patented Sept. 19, 1911.
7 SHEETS—SHEET 6.
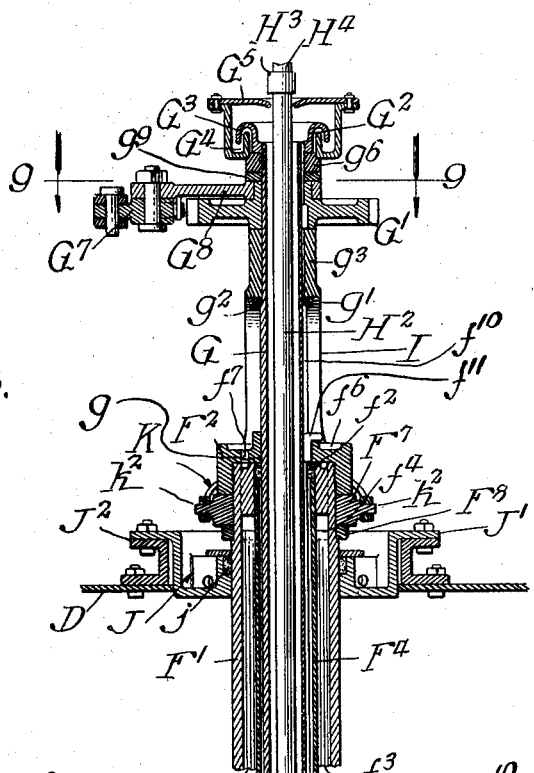

S. B. SHELDON.
GAS PRODUCER.
APPLICATION FILED MAR. 26, 1910.
1,003,524.
Patented Sept. 19, 1911.
7 SHEETS—SHEET 7.
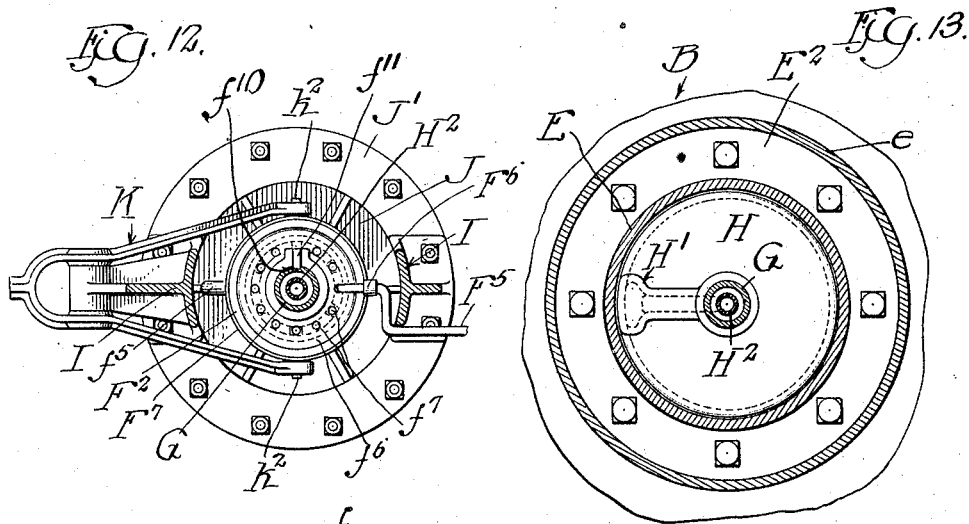
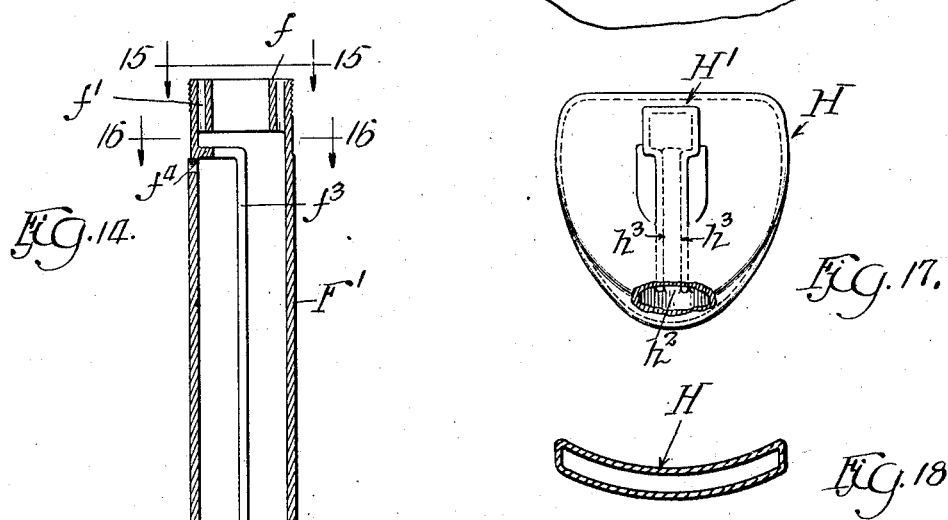
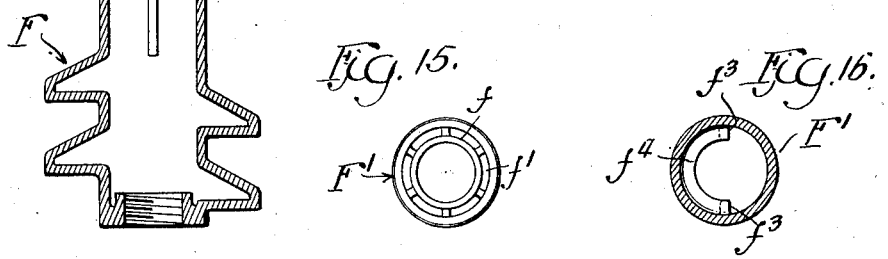
Witnesses:
Inventor
Samuel B. Sheldon
by Poole & Brown
Attys

UNITED STATES PATENT OFFICE.

SAMUEL BERTRAM SHELDON, OF SOUTH BETHLEHEM, PENNSYLVANIA.

GAS-PRODUCER.

1,003,524.          Specification of Letters Patent.       Patented Sept. 19, 1911.

Application filed March 26, 1910. Serial No. 551,715.

*To all whom it may concern:*

Be it known that I, SAMUEL B. SHELDON, a citizen of the United States, and a resident of South Bethlehem, in the county of Northampton and State of Pennsylvania, have invented certain new and useful Improvements in Gas-Producers; and I do hereby declare that the following is a full, clear, and exact description thereof, reference being had to the accompanying drawings, and to the letters of reference marked thereon, which form a part of this specification.

This invention relates to improvements in means for charging or feeding fuel to the fire chamber of a gas producing furnace and consists in the matters hereinafter set forth and more particularly pointed out in the appended claims.

My invention is illustrated in the accompanying drawings in which,—

Figure 1:
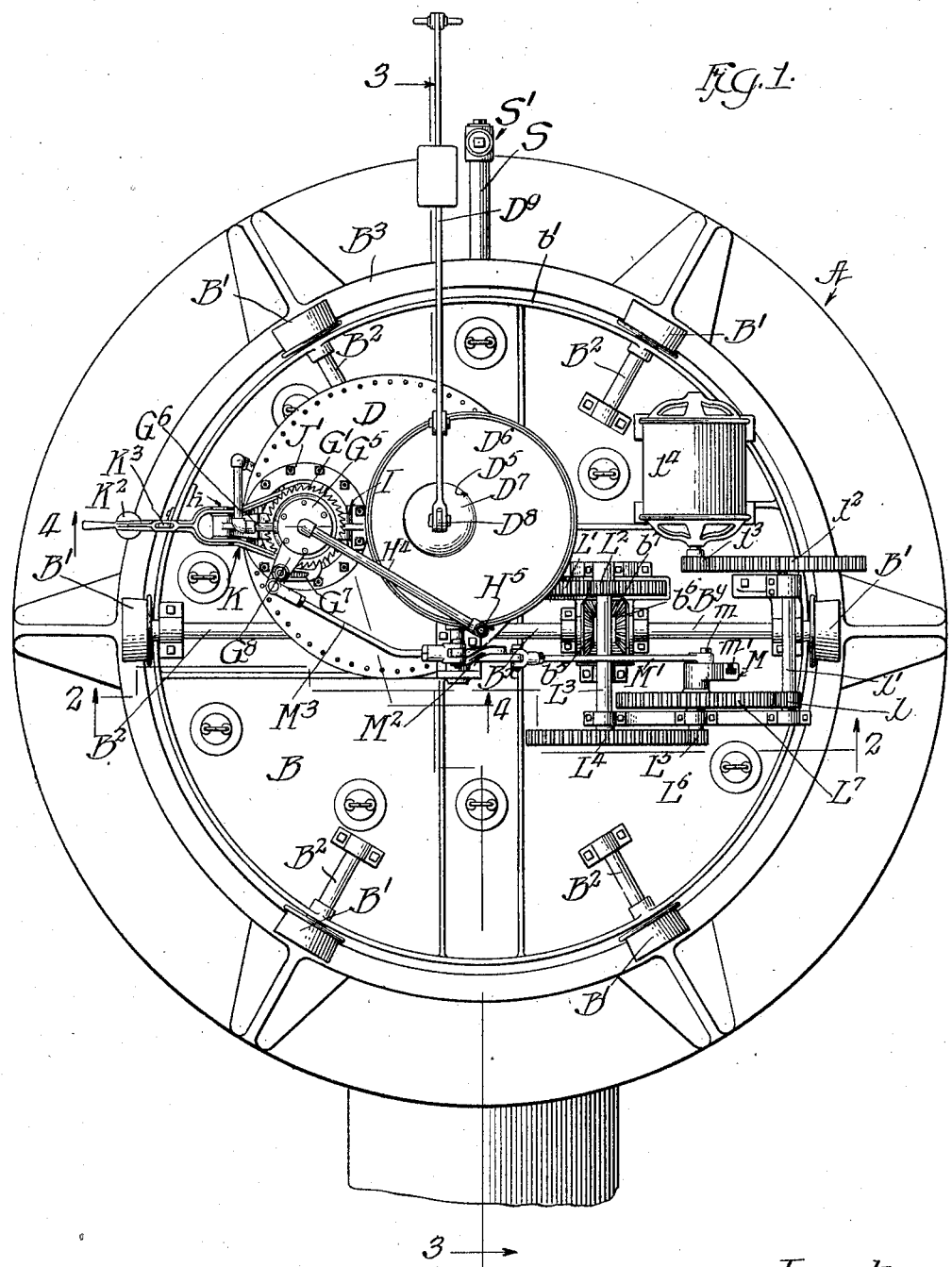
Figure 2:
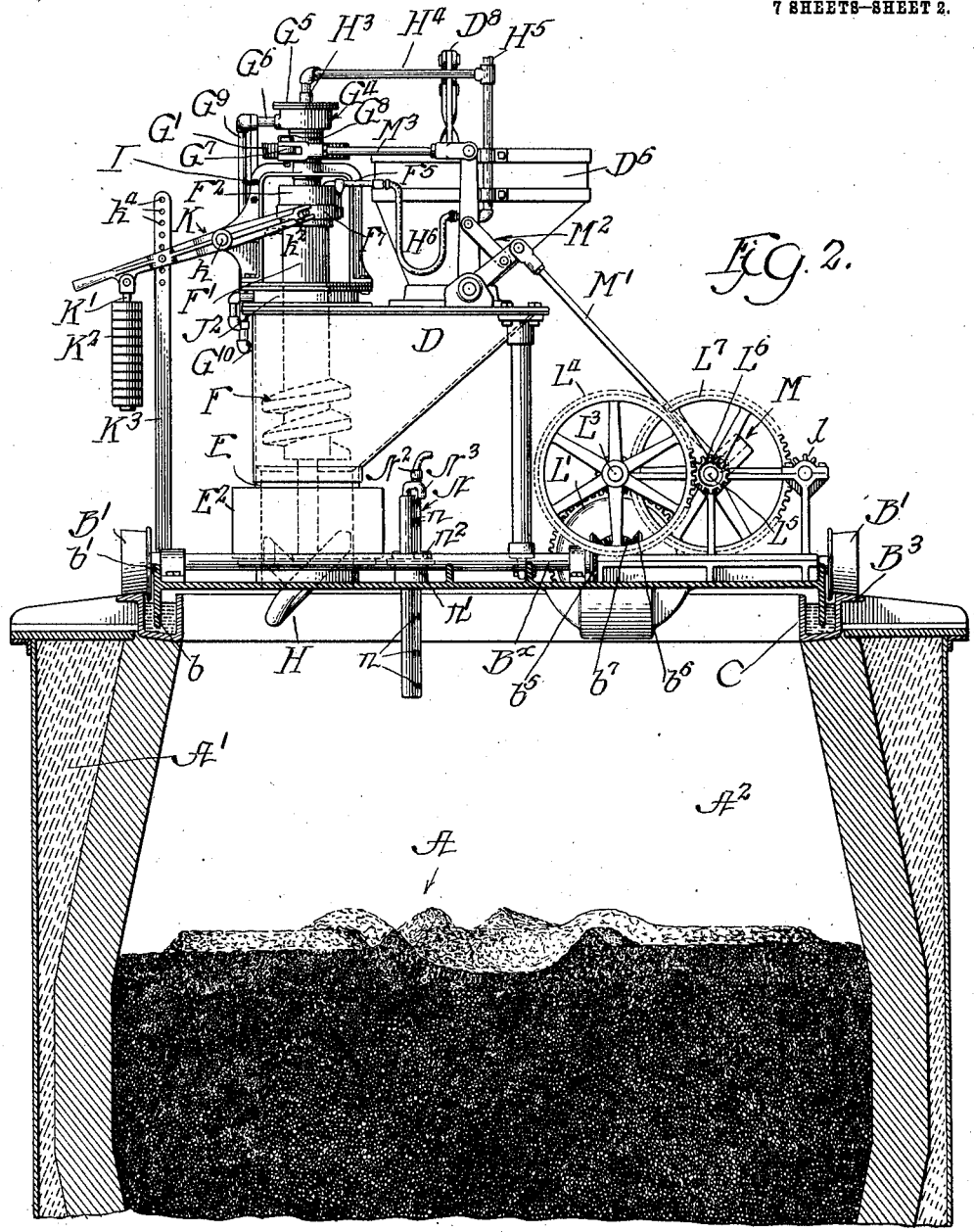
Figure 3:
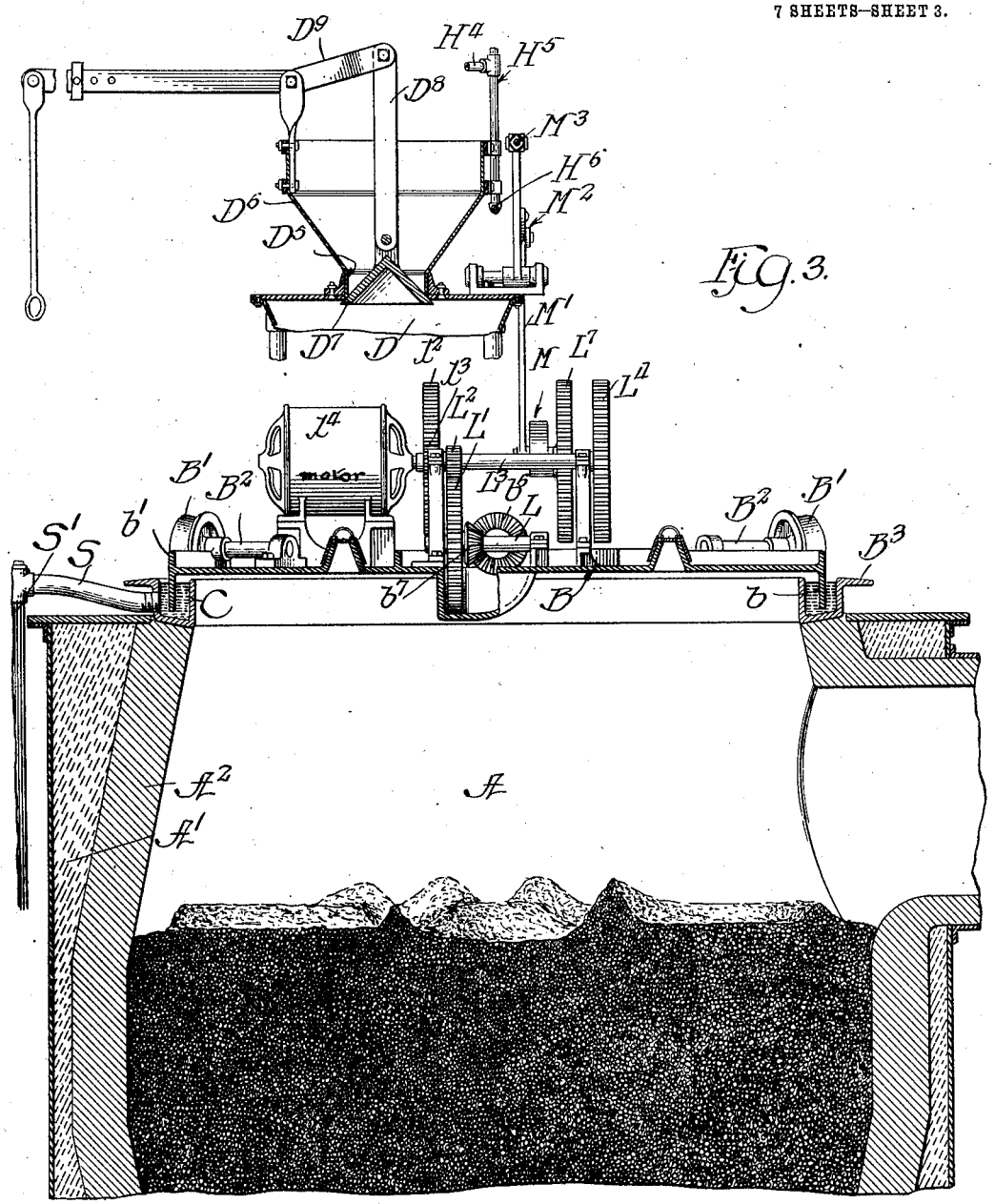
Figure 4:
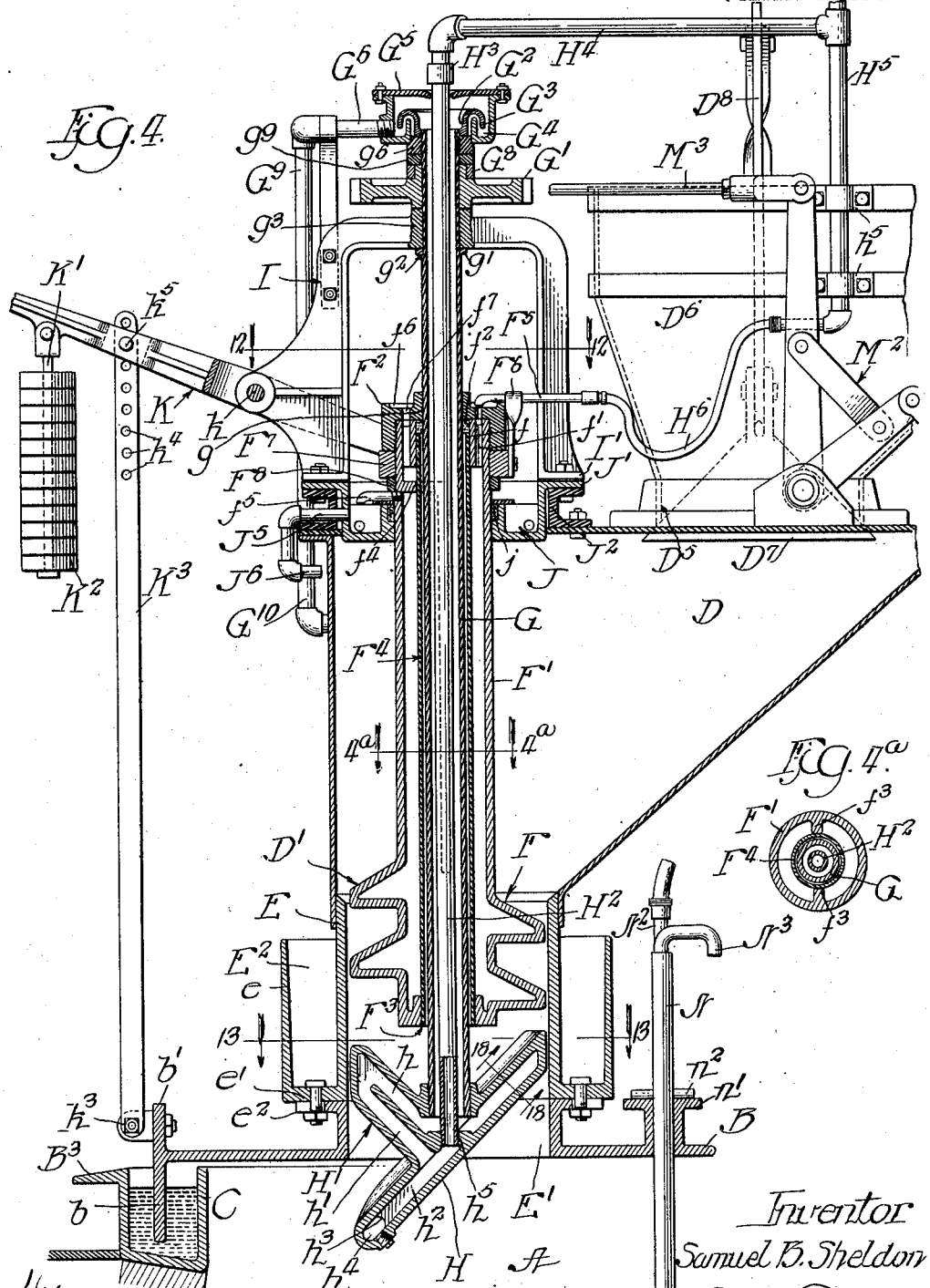

Figure 1 is a top plan view of a gas producing furnace provided with my improved charging and feeding device. Fig. 2 is a vertical section through Fig. 1 on the line 2—2 thereof. Fig. 3 is a vertical section through Fig. 1 on the line 3—3 thereof. Fig. 4 is a vertical section through the hopper on an enlarged scale on the line 4—4 of Fig. 1. Fig $4^a$ is a horizontal cross-section through the worm-shaft on the line $4^a$—$4^a$ of Fig. 4. Fig. 5 is a transverse section through the gas producer showing a top plan view of the coal therein and the path of distribution of the coal in top plan view. Fig. 6 is a vertical section through Fig. 5 on the line 6—6 thereof. Fig. 7 is a diagrammatic view illustrating the way the coal is distributed over the surface in my improved charging or feeding device. Fig. 8 is a partial vertical section through Fig. 4. Fig. 9 is a transverse section through Fig. 8 on the line 9—9 thereof. Fig. 10 is a similar section showing the parts in a different position. Fig. 11 is a side elevation of the deflector plate shown partially in section. Fig. 12 is a partial transverse section through Fig. 4 on the line 12—12 thereof. Fig. 13 is a partial transverse section through Fig. 4 on the line 13—13 thereof. Fig. 14 is a vertical section through the worm and its shaft. Fig. 15 is a top plan view of the same. Fig. 16 is a transverse section through Fig. 14 on the line 16—16 thereof. Fig. 17 is a front elevation of the distributer. Fig. 18 is a transverse section through the same on the line 18—18 of Fig. 4.

As illustrated in the drawings, A indicates the fire-chamber of a gas producing furnace, said fire chamber being surrounded by a wall $A^1$ lined with fire-brick $A^2$.

B indicates the top of the fire chamber which consists of a circular plate which supports the charging or feeding mechanism and the motor which operates it. Said top is rotatably mounted on the walls of the furnace by means of flanged wheels $B^1$ journaled on stub-axles $B^2$ secured to the outer surface of the top B and running on a circular track $B^3$ formed by a horizontal flange at the outer edge of an annular trough C which is supported on the walls of the fire-chamber. The top B is provided with an annular vertical flange $b$ which depends into the trough C, so that when the trough C is partially filled with water, as shown in the drawings, a water-seal will be formed between the top B and the furnace chamber A. An upwardly extending, annular flange $b^1$ surrounds the top and incloses a body of water for cooling said top.

D indicates the hopper from which the coal is discharged into the furnace chamber A. This is arranged to one side of the center of the top B and is provided with an opening $D^1$ at its bottom where it is connected with a vertical cylindric chamber E which is supported in any convenient manner above an opening $E^1$ in the top of the fire chamber.

$E^2$ indicates a deep, annular trough which surrounds the chamber E and is adapted to contain water to cool said chamber. Said trough is preferably formed by means of a vertical cylinder $e$ which surrounds the chamber E and is formed integrally with a horizontal flange $e^1$ at the base of the vertical wall of the chamber E. Said flange $e^1$ rests upon a horizontal flange $e^2$ formed about the circular opening $E^1$.

F represents a worm which is constructed to rotate in the chamber E. Said worm is hollow and is formed at the bottom of a hollow tube or pipe $F^1$ which communicates with its interior. Said pipe is closed at the top by an internally screw-threaded cap $F^2$ which is screwed upon its upper end. The lower end of the worm is provided with an annular threaded opening $F^3$ in which is secured the threaded end of an inner pipe F⁴. Within the upper end of the pipe F¹ is located a ring $f$ which is rigidly connected to said pipe by means of radially extending ribs $f^1$ (see Figs. 4 and 15). The inner tube F⁴ extends at its upper end within said cylindric band $f$ and is held in position at this point by means of a packing ring $f^2$ which is interposed between the upper end of said pipe F⁴ and the cap F². The pipes or tubes F¹ and F⁴ are thus separated by an annular chamber and form a hollow hub for the worm. Said annular chamber is divided longitudinally by means of diametrically opposite ribs $f^3$ $f^3$ (see Fig. 4ª) which extend from the top of the worm F to a point near the top of the tube F¹, where they are connected by a shoulder $f^4$ which projects from the inner wall of the tube F¹ and abuts against the outer surface of the tube F⁴. Just below the said shoulder $f^4$ is located a small outlet pipe $f^5$ which is threaded into the tube F¹.

The cap F² is provided with an annular channel $f^6$, in the bottom of which and between the ribs $f^1$ are located openings $f^7$ which communicate with the chamber between the pipes F¹ and F⁴. A discharge pipe F⁵ is supported above said annular channel in position to discharge therein. As shown in the drawings, said discharge pipe is supported by a strap F⁶ which is bolted to a collar F⁷ surrounding the pipe F¹. Said collar is retained between the lower edge of the cap F² and a ring F⁸, surrounding the pipe F¹ and resting against an annular shoulder formed in the outer surface thereof. It is apparent from this construction that water entering through the discharge pipe F⁵ will fall into the channel $f^6$ of the cap F² and from thence pass through the openings $f^7$ in the bottom of said channel, between the ribs $f^1$ to the right of the vertical ribs $f^3$ (see Fig. 4) dividing the chamber between the pipes F¹ and F⁴. It will then descend down into the hollow worm and becoming heated there, will rise on the left-hand side of said ribs to the discharge pipe $f^5$.

G indicates a hollow shaft which is vertically mounted within the tube F⁴. Said shaft G projects below the base of the worm F and has secured to its lower end a distributing member H. It extends at its upper end through an annular opening formed in the cap F², as indicated at $g$, and the packing ring $f^2$ prevents the entrance of water at this point. Said shaft is provided on its outer surface (Fig. 8) with a long key-way $f^{10}$, in which engages a key $f^{11}$ secured to the cap F², which, as described above, is rigidly secured to the upper ends of the pipes F¹, F⁴ constituting the hollow hub of the worm. The worm and its hub thus rotate with the shaft G but are feathered to it so as to be movable vertically thereon. The said shaft G has bearing at a point above the cap F² in a yoke I which is supported on the top of the hopper in a manner presently to be described. A collar $g^1$ bears between a shoulder $g^2$ formed in the outer surface of the shaft G and the lower end of the bearing $g^3$ formed in said yoke. Secured to the shaft above said yoke is a ratchet wheel G⁴ by means of which it may be rotated. Said ratchet wheel is adapted to be operated by a pawl G⁷ (see Figs. 4, 8 and 9) carried by an oscillating arm G⁸ which is pivoted on the hub of the ratchet and retained in place by a washer $g^5$ and a threaded collar $g^6$. To the upper end of the shaft is secured a ring provided with an outwardly and downwardly curved flange G², G³, which flange depends within an annular trough G⁴ supported at the top of said shaft. Said trough is closed at the top by a plate G⁵ and rests on a collar $g^6$ surrounding the hollow shaft G. A threaded nipple is provided at a point in the outer wall of said trough and within said nipple is secured a pipe G⁶.

The distributing member H is inclined or arranged at an angle to its supporting shaft G in order to facilitate the discharge of the fuel therefrom, and its lateral or side edges are elevated so that its top surface is concave or of trough shape, so that the layer of the fuel, as it falls upon and passes over said member is laterally confined and delivered in a narrow or compact stream. Said distributing member is made hollow and the hollow shaft G communicates with its interior. It is provided with a hollow bearing member H¹ which is divided internally into communicating channels, the upper one of which, $h$, connects with the hollow shaft G, while the lower one, $h^1$, connects with a narrow channel $h^2$, formed by ribs $h^3$ $h^3$, (see Figs. 4 and 13) which run from the center of the distributing member downward, terminating short of the end wall of said member so as to provide openings $h^4$ by means of which said channel connects with the main chamber formed in said distributing member. At the upper end of the channel $h^2$ is formed a screw-threaded nipple $h^5$ to which is secured the lower end of a vertical pipe H², located within the hollow shaft G. Its upper end projects above the upper end of said shaft, through an opening in the plate G⁵ covering the trough G⁴ and is there rotatably connected by a coupling H³ to a radially extending water-pipe H⁴, which is secured at its inner end to a centrally located, rotatably supported, vertical pipe H⁵.

The upper end of the pipe F¹ forming the outer wall of the hollow hub of the worm F has bearing within a stuffing box $j$, which is formed on the inner, vertical wall of an annular trough J, which is located at the top of the hopper D, and surrounds said pipe. The outer wall of said trough is provided with a horizontal flange $J^1$ upon which rests a horizontal flange $I^1$, forming the base of the yoke I, and which in turn rests on an annular channel bar $J^2$ which is supported upon and secured to the top of the hopper. The pipe $f^5$ leading from the interior of the pipe $F^1$ discharges into the trough J.

The worm-shaft is adapted to be raised or lowered, in order to adjust the hollow worm F with reference to the top of the worm-chamber E, and to this end a forked lever K is pivotally mounted on the yoke I, as at $k$, and has its forked arms pivotally connected to the collar $F^7$, as at $k^2$ (see Fig. 12), while the other arm carries a depending, pivotally connected rod $K^1$ upon which is supported a counterweight $K^2$. A vertical rod $K^3$ pivotally connected at $k^3$ to the flange $b^1$ of the fire chamber top B is provided with a series of openings $k^4$, by means of one of which in connection with a pin $k^5$, said lever K may be locked in any position so as to maintain the worm at the desired level in its chamber.

The circulation of cooling water supplied to the various parts above described is as follows: Water enters through the feed pipe $H^5$ and thence passes through the pipe $H^4$ to the vertical pipe $H^2$. From this it passes through the channel $h^2$ of the distributing member H and after passing through the hollow interior of said member and becoming heated, rises in the space between the hollow shaft G and the inner vertical tube $H^2$ until it fills and overflows the cup $G^2$ whence it falls into the annular trough $G^4$. From said trough it passes through the pipe $G^6$ to a vertical pipe $G^9$ which depends therefrom and which is provided at its lower end with a discharge spout $G^{10}$ which directs the falling water against the outer wall of the hopper D. From here the water falls into and fills the trough $E^2$ located about the walls of the worm chamber. The overflow from said trough fills the basin on the top B inclosed by the flange $b^1$. The lower end of the pipe $H^5$ is connected by a flexible tube or hose $H^6$ with the discharge pipe $F^5$. From this water passes through the hollow worm hub and worm and thence out of the discharge spout $f^5$ into the trough J. A pipe $J^5$ conducts the water from the trough J and is provided with a discharge spout $J^6$ which is adapted to direct the falling water against the outer wall of the hopper D, down which it flows into the trough $E^2$.

In the top of the hopper D is a circular opening in which is fitted the neck $D^5$ of a smaller hopper $D^6$, by means of which fuel is fed to the hopper D. Said neck $D^5$ is normally closed at its lower end by means of a valve or bell $D^7$ fixed to the lower end of a vertical operating rod $D^8$ which is pivotally connected to an operating lever $D^9$ fulcrumed at the upper edge of said smaller hopper. The feed pipe $H^5$ is supported by means of straps $h^5$, $h^5$ secured to the side walls of the small hopper $D^6$.

The top of the fire chamber is rotated by the following mechanism: Two of the shafts $B^2$ are arranged with their axes in the same line in a vertical plane passing through a diameter of the top and are prolonged toward each other as indicated at $B^x$, $B^y$. To their abutting ends are secured beveled gears $b^5$, $b^6$ which are connected by means of a third beveled gear $b^7$. It is apparent that the rotation of the gear $b^7$ will cause the gears $b^5$ and $b^6$ to rotate in opposite directions, which causes the flanged rollers $B^1$ on their respective shafts to advance in the same direction about the track $B^3$, thus producing a rotation of the top. The gear $b^7$ is keyed to a shaft L carrying a spur gear $L^1$ which meshes with a pinion $L^2$ on a shaft $L^3$ above the first named shaft. Said shaft $L^3$ carries at its opposite end a gear $L^4$ which is in mesh with a pinion $L^5$ on a short shaft $L^6$ carrying a second gear $L^7$. The latter gear is driven by a pinion $l$ on a shaft $l^1$ to which is keyed a gear $l^2$ meshing with a pinion $l^3$ on the shaft of a motor $l^4$ which is supported in any convenient manner on the top of the fire chamber above the surface of the water. The several shafts mentioned are supported by convenient brackets which are secured to said top B.

On the end of the shaft $L^6$ is secured a slotted crank arm M. In the slot $m^1$ of said arm is secured a block $m$ to which is pivotally connected one end of a connecting rod $M^1$. The other end of said rod is pivotally connected to a rocking bell-crank lever $M^2$ which is pivotally mounted on the top of the hopper D and which operates a link $M^3$ pivotally connected to the oscillating arm $G^8$ which carries the operating pawl $G^7$. It is apparent that the rotation of the shaft $L^6$ will impart to the arm $G^8$, through the crank arm M, the connecting rod $M^1$, the bell crank lever $M^2$, and the link $M^3$, an oscillatory movement which will intermittently rotate the ratchet $G^1$ through a certain angle, for every rotation of said shaft. By adjusting the block $m$ in the slot $m^1$ of the crank arm M, the throw of the arm $G^8$ may be varied, and with it the angle through which the ratchet $G^1$ is turned for each revolution of the shaft $L^6$. This intermittent rotation of the ratchet is communicated to the distributing member H, and to the worm F, which turns with it. By this arrangement the fuel delivered from the distributing member is distributed in a path which is determined by the revolution of said distributing member, as a whole, about the axis of the fire chamber, and also by the rotation of said distributing member about its own axis. This distributes the coal in a curved path of cycloidal character comprising a series of loops which, as illustrated in Fig. 5, shows the appearance of the curve when the distributing member and the top are turning in the same direction.

In order to determine how near the inner ends of the loops of the path of the feed shall approach the center, it is preferable to provide a deflecting member which may be adjusted at different levels to stand in the path of the coal as it shoots from the distributing member. It consists of a vertical plate arranged transversely of that diameter of the top B which is intersected by the axis of the distributing member shaft, between said axis and the axis of the fire chamber. It is slidably mounted in a slot, through the top B, about which is formed a flanged web $n^1$ to prevent the entrance of water from the basin on the top B. Said plate is provided with a series of pairs of openings $n$ in which are located pins $n^2$ which are adapted to support said deflecting member N at the desired height. Said deflecting member is provided with an internal passageway or conduit $N^2$ which is adapted to distribute cooling water downward and from one edge to the other of said plate, and with a vertical conduit $N^3$ in which the heated water rises and from which it is discharged into the basin on the top B of the furnace chamber.

The operation of the device is as follows:—Fuel is fed to the smaller hopper $D^6$ and from time to time, as required, is delivered from that to the hopper D by depressing the bell $D^7$. The motor is started, which causes a continuous rotation of the top and an intermittent rotation of the worm F and the distributing member H. The rotation of the top causes the hopper to be carried around therewith in a circular path about the axis of the gas chamber and at the same time the delivery end of the distributing member describes a circular path with reference to the center of the delivery opening of said hopper. The rotation of the worm F feeds the coal downward from the hopper through the worm casing, the amount of coal fed by the worm being in direct proportion to its speed of rotation. The rate of this speed may be varied by varying the angle through which the ratchet wheel G is rotated, as hereinbefore described. From the worm the coal falls upon the distributing member H, which, by reason of its concave form, distributes the coal in a line or course located in a vertical plane through the axis of the distributing member. By reason of the revolution of the distributing member about the axis of the fire chamber and also its rotation on its own axis, however, this line or course intersects the top surface of the fuel in the gas chamber at a series of points which lie in a curved path, forming a pattern or figure comprising a series of loops, as indicated in Fig. 5. The path described by the falling coal is of cycloidal character and its exact shape will depend upon the relative speeds of rotation of the distributing member and of the top, and also upon whether the top and distributing member rotate in the same or in opposite directions. If the distributing member and the top of the gas chamber are rotated in the same direction, the path described by the falling coal will be like that illustrated in Fig. 5, but if the direction of rotation of the distributing member be opposite to that of the rotation of the top, said path, will be of similar character, but the loops will be wider toward the periphery of the gas chamber instead of narrower, as in Fig. 5. The coal falls from the distributer at any point in an appreciable quantity, and packs in a conical pile. These conical piles are comparatively close together, so that there is formed a substantially continuous ridge of coal, which is V-shaped in cross-section (see Fig. 6.) The angle of the V will depend upon the angle of flow of the coal, and also upon the amount allowed to fall off the distributer. The latter depends upon the rotative speed of the worm so that the width of the ridge at its base depends upon the speed at which the worm rotates. Between adjacent sections of the looped path there will be substantially little or no coal at any given period, so that the fire is maintained at a high rate of efficiency and the necessity for poking obviated or reduced. In the operation of the device, no two successive figures or patterns of the complete looped path coincide, the looped figure or pattern formed by one complete rotation of the top falling slightly in advance of or behind the looped figure or pattern formed by the next preceding revolution of the top, since the end of one figure does not fall upon the same point as the preceding figure started, but in advance of or back of that point. In time the coal is distributed evenly over the entire surface, as indicated in the diagrammatic view shown in Fig. 7. In said figure, the heavy line shows the looped figure or pattern formed during a complete rotation of the top, the lighter line the looped figure or pattern formed during the next complete rotation of the top, and the dotted line, a third looped figure or pattern formed by a third revolution. None of these complete figures or patterns coincide or fall one upon the other.

By adjusting the deflecting member up or down, the location of the inner sections of the looped path with reference to the center of the gas chamber is determined, and this part of the band may be flattened to leave a larger free surface at the center of the fire chamber.

The worm is movable up and down on the hollow shaft G, as has been heretofore described, and this is of particular advantage in feeding coal which has an angle of flow approaching a right angle such, for example, as wet coal. When such coal is to be fed the worm may be raised above the worm chamber, so that its lower end is in the plane of the top of the worm chamber, in which case the worm will bite into the coal above the chamber and drop it vertically onto the distributer.

All of the moving parts described herein are sealed so as to prevent any possibility of gas escaping from the gas chamber. The water for the seals is furnished by the overflow of the cooling water supplied to the various parts. When the water rises above the required height to maintain the seal in the trough C, it overflows through a pipe S which connects with a vertical pipe $S^1$, which leads to any convenient place of disposal.

While I have illustrated and described herein one modification of my invention, it is to be understood that the various details of mechanical arrangement and construction may be modified in different ways without departing from the spirit of my invention and I do not wish to be limited to them except as pointed out in the appended claims.

I claim as my invention:—

1. The combination with a fire chamber, of a rotative top wall inclosing the top of said chamber, a water-seal between said rotative top wall and said fire chamber, a fuel hopper located above said top wall, fuel feeding mechanism comprising an upright cylindric casing, and a rotating worm, said casing being connected at its upper end to said hopper and opening at its lower end through said top wall between the center and the circumference thereof, said worm being hollow and being provided with a vertically extending hollow hub opening into its hollow interior, a hollow distributing member located below said worm, a hollow rotating shaft for said distributing member, said worm turning with said hollow shaft, means for supplying cooling water to said worm-hub and to said hollow shaft, and means for rotating said top wall and said shaft.

2. The combination with a fire chamber, of a rotative top wall inclosing the top of said chamber, a water seal between said rotative top wall and said fire chamber, a fuel hopper located above said top wall, fuel feeding mechanism comprising an upright cylindric casing, and a rotating worm, said casing being connected at its upper end to said hopper and opening at its lower end through said top wall between the center and the circumference thereof, said worm being hollow and being provided with an upright hollow hub opening into its hollow interior, a hollow distributing member located below said worm, a hollow rotating shaft for said distributing member, said worm-hub being feathered to said shaft, means for supplying cooling water to said worm-hub and shaft, means for adjusting the level of said worm with reference to said casing, and means for rotating the top of said fire chamber and for rotating said shaft.

3. The combination with a fire chamber, of a top wall inclosing the top of said chamber, a fuel hopper located above said top wall, fuel feeding mechanism comprising an upright cylindric casing and a rotating worm, said casing being connected at its upper end to said hopper and opening at its lower end through said top wall of the fire chamber, said worm being adjustable in a vertical direction with reference to said casing, and means for locking said worm against vertical movement.

4. The combination with a fire chamber, of a top wall inclosing the top of said chamber, a fuel hopper located above said top wall, fuel feeding mechanism comprising an upright cylindric casing and a rotative worm, said casing being connected at its upper end to said hopper and opening at its lower end through said top wall, a distributing member located below said worm and having bearing within said casing, a rotating vertical shaft to the lower end of which said distributing member is secured, said worm being feathered to said shaft, and means for adjusting said worm vertically on said shaft with reference to said casing and for locking it in position.

5. The combination with a fire chamber, of a top wall inclosing the top of said chamber, a fuel hopper located above said top wall, fuel feeding mechanism comprising an upright cylindric casing and a rotative worm, said casing being connected at its upper end to said hopper and opening at its lower end through said top wall, a distributing member located below said worm and having bearing within said casing, a rotating vertical shaft to the lower end of which said distributing member is secured, said worm being feathered to said shaft, means for adjusting said worm vertically on said shaft with reference to said casing and for locking it in position, and a counterweight adapted to balance said worm.

6. The combination with a fire chamber, of a rotative top wall inclosing the top of said chamber, a water seal between said rotative top wall and said fire chamber, a fuel hopper located above said top wall, fuel feeding mechanism comprising an upright cylindric casing and a rotating worm, said casing being connected at its upper end to said hopper and opening at its lower end through said top wall between the center and the circumference thereof, a distributing member located below said worm and rotating therewith, said distributing member being constructed to deliver said fuel at any instant in a line or course located in plane extending through the vertical axis of said distributing member, and means for rotating said top of said fire chamber and for rotating said worm and distributing member.

7. In combination with a fire chamber, of a rotative top wall inclosing the top of said chamber, a water seal between said top wall and fire chamber, a fuel hopper located above said top wall, fuel feeding mechanism comprising an upright cylindric casing and a rotating worm, said casing being connected at its upper end to said hopper and open at its lower end through said top wall between the center and circumference thereof, a distributing member located below said worm and rotating therewith, means for rotating said top wall and said worm and distributing member on their respective axes, and means for varying the rate of rotation of said worm and distributing member.

8. Means for feeding fuel to a gas producer embracing a vertical cylindric casing, a hollow worm provided with a hollow hub extension, a pipe located within said worm and having closed connection with the bottom of said worm and the top of said hub, a hollow shaft located within said pipe, said shaft and pipe being constructed to rotate together, a central pipe located within said hollow shaft, a hollow distributing member secured to the end of said hollow shaft below said worm, said central pipe projecting into the interior of said hollow distributing member, said central pipe and said hollow worm hub being connected to a source of cooling water supply and means for drawing off the water from the top of said hollow shaft and from the top of said hollow worm.

9. In a fuel feeding mechanism the combination with a hopper, a vertical worm casing connected with the bottom thereof, a hollow worm adapted to work in said casing, said worm being provided with a hollow hub, a pipe located within the said worm and hub and having closed connection at its ends with the bottom of said worm and with the top of said hub, means for dividing the annular space within said hub into two longitudinally extending chambers, means for supplying cooling water at the top of one of said chambers and for drawing said water off at or near the top of the other chamber, a hollow vertical shaft located within the hollow worm and worm hub which are constructed to turn with said shaft, a distributing member carried at the lower end of said shaft below said worm, said distributing member being divided into separate chambers, one of which opens into said hollow shaft, a vertical central pipe located within said hollow shaft connected with the other of the chambers in said distributing member, and means for supplying cooling water to the top of said central pipe and for drawing off said cooling water from a point near the top of said hollow shaft.

10. In a gas producer, in combination with a hopper, means for feeding fuel from said hopper embracing a vertical cylindric casing and a hollow worm and hub, a hollow shaft constructed to rotate with said worm and worm hub, a hollow distributing member connected to said hollow shaft and located below said worm, said worm and worm hub and said shaft and distributing member being constructed for the independent circulation of cooling water therethrough, and means for independently supplying cooling water to and for discharging it from said shaft and worm hub at points at or near their upper ends.

11. In a gas producer, in combination with the fire chamber and a top inclosing the same, a hopper supported above said top, a vertical casing connected to said hopper at one end and opening through said top at the other, a hollow worm adapted to feed the fuel through said vertical casing, said worm having a hollow hub extending vertically above said hopper and divided laterally into longitudinally extending chambers, each communicating with the hollow interior of said worm, a hollow rotating shaft located within said worm hub and extending vertically above it, said worm and worm-hub being adapted to rotate with said shaft, said shaft being provided with longitudinally extending inner and outer concentric chambers, a hollow distributing member secured to the lower end of said shaft below said worm, the inner and outer chambers of said shaft being connected with the hollow interior of said distributing member, means for supplying cooling water to one of each of the longitudinally extending chambers in said shaft and worm hub near the tops thereof, means for discharging water from the tops of the other longitudinally extending chambers in said shaft and worm hub, said discharging means being constructed to direct the water against the outer walls of said hopper, and an open trough surrounding said casing adapted to receive the water as it runs down the walls of said hopper.

12. In a gas producer, in combination with the fire chamber and a top inclosing the same, a hopper supported above said top, a vertical casing connected to said hopper at one end and opening through said top at the other, a hollow worm adapted to feed the fuel through said vertical casing, said worm having a hollow hub extending vertically above said hopper, a hollow rotating shaft located within said worm hub and extending vertically above it, said worm and worm hub being adapted to rotate with said shaft, a hollow distributing member secured to the lower end of said shaft below said worm, means for supplying cooling water to said hollow shaft and to said hollow worm and hub, means for discharging said water from said worm hub and shaft at points at or near the upper ends thereof, said discharging means being constructed to direct the water against the outer surface of said hopper, and a trough surrounding said casing adapted to receive the water as it falls from the surface of said hopper.

13. In a gas producer, in combination with a fire chamber, a rotative top inclosing the same and a water seal between said rotating top and said fire chamber, a hopper supported above said rotating top between the center and circumference thereof, a vertical casing connected at its upper end to said hopper and opening at its lower end through said rotating top, a hollow worm adapted to feed fuel through said casing, said worm being provided with a hollow hub extending vertically through the top of said hopper, a pipe located within said worm and worm hub and having closed connection with the top of said hub and the bottom of said worm, forming an inclosed chamber within the worm and worm hub, means for dividing the annular space within said hub into laterally disposed longitudinally extending chambers, an annular trough secured to the top of said hopper surrounding the upper end of said worm hub, said worm hub having gas-tight bearing within said annular trough, means for supplying cooling water to one of the laterally disposed chambers in said worm hub, a discharge pipe adapted to discharge the water from the uppper end of the other chamber into said trough, a hollow shaft located within said worm and worm hub, said shaft being divided longitudinally into two chambers, one of which is open at the top, a distributing member secured to the lower end of said shaft below said worm, said distributing member being made hollow and having its hollow interior connected with the longitudinal chambers in said shaft, said worm and hub being feathered to said shaft for adjusting said worm and hub upon said shaft in vertical relation thereto, a flanged ring located at the upper end of said shaft and communicating with the interior thereof, a trough within which the flange of said ring depends, a discharge pipe leading from said trough, and means for rotating said shaft.

14. In a gas producer, in combination with a hopper and means for feeding fuel therefrom, a rotating distributing member adapted to receive fuel from said fuel feeding means, said distributing member having a revolving movement about the central axis of said gas producer and being constructed to deliver the fuel at any given instant in a line or course located in a vertical plane, and a deflecting member having fixed horizontal relation to said distributing member and being adjustable vertically with reference thereto.

15. In a gas producer, in combination with a fire chamber, a rotary top inclosing the same, a hopper supported above said top, fuel feeding mechanism embracing a vertical cylindric casing and a worm, said casing being connected at its upper end to said hopper and opening at its lower end through said top, said worm having a vertically extending hub which has bearing in the top of said hopper, a vertical shaft to which said worm hub is keyed, a distributing member carried at the lower end of said shaft below said worm, said distributing member being constructed to have bearing relation with said casing, and a standard supported above said hopper provided with a bearing for the upper end of said shaft.

16. In a gas producer, in combination with a fire chamber, a rotary top inclosing the same, a hopper supported above said top, fuel feeding mechanism embracing a vertical cylindric casing and a worm, said casing being connected at its upper end to said hopper and opening at its lower end through said top between the center and the circumference thereof, said worm having a vertically extending hub which has bearing in the top of said hopper, a vertical shaft to which said worm hub is keyed, a distributing member carried at the lower end of said shaft below said worm, said distributing member being constructed to have bearing relation with said casing, a standard supported above said hopper provided with a bearing for the upper end of said shaft, means supported on said rotary top adapted to rotate the same, and pawl and ratchet mechanism adapted to intermittently rotate said shaft, said pawl and ratchet mechanism having operative connection with said top rotating means.

17. In a gas producer, in combination with fuel feeding mechanism embracing a vertical cylindric casing and a worm, a hollow distributing member located below said worm, a rotating shaft to which said distributing member is secured, said shaft being hollow and comprising inner and outer pipes separated by an annular space, and said distributing member being inclined at an angle to said shaft and being in the form of a concave plate having bearing at its upper margin within said casing and being provided with a hollow projecting rib with its axis in the vertical plane through the axis of said shaft, said rib also having bearing within said casing, the hollow interior of said distributing member including said projecting rib being constructed for the circulation of cooling water admitted and discharged through the pipes comprising said shaft.

In testimony, that I, claim the foregoing as my invention I affix my signature in the presence of two witnesses, this fourteenth day of March A. D. 1910.

SAMUEL BERTRAM SHELDON.

Witnesses:
A. C. GRAHAM,
C. A. SHELDON.

Copies of this patent may be obtained for five cents each, by addressing the "Commissioner of Patents, Washington, D. C."